(12) United States Patent
Ichikawa

(10) Patent No.: US 8,525,476 B2
(45) Date of Patent: Sep. 3, 2013

(54) CONNECTING DEVICE FOR SUPPLYING ELECTRIC POWER FROM AN OUTSIDE POWER SUPPLY TO A VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 202 days.

(21) Appl. No.: 12/989,839

(22) PCT Filed: Oct. 9, 2008

(86) PCT No.: PCT/JP2008/068358
§ 371 (c)(1),
(2), (4) Date: Oct. 27, 2010

(87) PCT Pub. No.: WO2010/041319
PCT Pub. Date: Apr. 15, 2010

(65) Prior Publication Data
US 2011/0193521 A1   Aug. 11, 2011

(51) Int. Cl.
*H02J 7/00* (2006.01)
(52) U.S. Cl.
USPC ...... 320/109; 320/111; 191/12.2 R; 191/12.4; 191/12.2 A
(58) Field of Classification Search
USPC ............. 320/109, 111, DIG. 13; 191/12.2 R, 191/12.4, 12.2 A
See application file for complete search history.

(56) References Cited

U.S. PATENT DOCUMENTS

| | | | |
|---|---|---|---|
| 3,808,382 A * | 4/1974 | Blanch et al. ............ | 191/12.2 R |
| 4,389,608 A | 6/1983 | Dahl et al. | |
| 4,656,320 A * | 4/1987 | Maddock .................... | 191/12.4 |
| 4,842,108 A * | 6/1989 | Anderson et al. ......... | 191/12.2 A |
| 4,893,037 A * | 1/1990 | Schwartz .................... | 310/68 B |
| 5,101,082 A * | 3/1992 | Simmons et al. ......... | 191/12.2 R |

(Continued)

FOREIGN PATENT DOCUMENTS

| | | |
|---|---|---|
| JP | U-57-042514 | 3/1982 |
| JP | U-57-104713 | 6/1982 |

(Continued)

OTHER PUBLICATIONS

International Search Report issued in Application No. PCT/JP2008/068358; dated Dec. 2, 2008 (with translation).

(Continued)

*Primary Examiner* — Yalkew Fantu
*Assistant Examiner* — Manuel Hernandez
(74) *Attorney, Agent, or Firm* — Oliff & Berridge, PLC

(57) ABSTRACT

A connecting device includes: a shaft; a drum that has a container defined therein and is rotatably disposed on the shaft; a stator that is fixed to the shaft and is contained inside of the container; a rotator that is fixed to the drum, is rotatably disposed on the shaft, and is contained inside of the container with an interval with respect to the stator; first terminals that are disposed in the stator; second terminals that are disposed in the rotator and are brought into contact with the first terminals, respectively; a connecting cord that is wound around the drum, and has a connecting plug to be connected to a vehicle at one end thereof whereas is electrically connected to the second terminals at the other end thereof; a power supply cord having a power source plug electrically connected to the first terminals at one end thereof whereas connected to an outside power supply at the other end thereof; and a leakage detector contained inside of the container.

4 Claims, 5 Drawing Sheets

(56) References Cited

U.S. PATENT DOCUMENTS

| | | | | |
|---|---|---|---|---|
| 5,596,258 | A * | 1/1997 | Kimura et al. | 320/163 |
| 5,662,193 | A * | 9/1997 | Ness | 191/12.2 R |
| 5,803,216 | A * | 9/1998 | McNaught | 191/12.4 |
| 5,855,262 | A * | 1/1999 | Jackson | 191/12.4 |
| 6,273,354 | B1 * | 8/2001 | Kovacik et al. | 242/404 |
| 6,281,663 | B1 | 8/2001 | Yagi et al. | |
| 6,439,360 | B1 * | 8/2002 | Miller | 191/12.2 R |
| 2006/0186255 | A1 * | 8/2006 | Rooker | 242/395 |
| 2006/0266605 | A1 * | 11/2006 | Caamano et al. | 191/12 R |

FOREIGN PATENT DOCUMENTS

| | | |
|---|---|---|
| JP | U-63-120516 | 8/1988 |
| JP | A-63-288874 | 11/1988 |
| JP | A-11-205909 | 7/1999 |
| JP | A-11-266509 | 9/1999 |
| JP | A-2001-145213 | 5/2001 |
| JP | A-2002-226143 | 8/2002 |
| JP | A-2003-219511 | 7/2003 |
| JP | A-2003-244832 | 8/2003 |
| JP | A-2008-042429 | 2/2008 |

OTHER PUBLICATIONS

International Preliminary Report on Patentability issued in Application No. PCT/JP2008/068358; dated Jul. 14, 2009 (with translation).
Written Opinion of the International Searching Authority issued in Application No. PCT/JP2008/068358; dated Dec. 2, 2008 (with translation).
Jul. 10, 2012 Office Action issued in Japanese Patent Application No. 2010-532736 (with translation).

* cited by examiner

CONNECTING DEVICE FOR SUPPLYING ELECTRIC POWER FROM AN OUTSIDE POWER SUPPLY TO A VEHICLE

TECHNICAL FIELD

The present invention relates to a connecting device and, more particularly, to a connecting device that has a connecting plug to be connected to a vehicle and a power source plug to be connected to a power supply and is provided for supplying electric power from an outside power supply to the vehicle.

BACKGROUND ART

In recent years, a hybrid automobile using a motor and an engine together for driving wheels or an electric automobile has gained the spotlight as an environmentally friendly automobile.

Such a hybrid automobile or an electric automobile has studied in such a manner as to be configured to be electrically charged from the outside. In this manner, an automobile can be electrically charged at home or the like, so that a driver goes to a gas station for replenishing fuel fewer times. It is convenient. In addition, inexpensive night electric power can be utilized, so that cost can be reduced.

Examples of chargers are disclosed in Japanese Patent Laying-Open No. 11-266509 (Patent Document 1) and Japanese Patent Laying-Open No. 11-205909 (Patent Document 2).

A charger disclosed in Japanese Patent Laying-Open No. 11-266509 (Patent Document 1) can cope with a plurality of kinds of electric automobiles, that is, can readily cope with a difference in cable connecting type or the like.

A charger for an electric automobile disclosed in Japanese Patent Laying-Open No. 11-205909 (Patent Document 2) is provided with a ground-fault interrupter interposed between the electric automobile and a receptacle for an outside AC power supply.

Patent Document 1: Japanese Patent Laying-Open No. 11-266509
Patent Document 2: Japanese Patent Laying-Open No. 11-205909

DISCLOSURE OF THE INVENTION

Problems to be Solved by the Invention

However, even in the above-described chargers in the prior art, a vehicle to be electrically charged need be moved near the charger. When the vehicle is electrically charged by using a domestic power supply, a receptacle and the vehicle are generally separated from each other. Moreover, when the vehicle is electrically charged away from home, a connecting plug for electric charge connected to a longer cord need be used.

In addition, when a battery of the vehicle is electrically charged, various kinds of equipment for transmitting various kinds of information such as a voltage or a current of a power supply to the vehicle need be mounted, and therefore, equipment for connecting the vehicle to the power supply per se becomes large in size, A large-sized connecting device requires a great accommodating space in the case where it is placed at home or inside of the vehicle, thereby lacking convenience.

The present invention has been accomplished to solve the above-described problems. Therefore, an object of the present invention is to provide a compact connecting device for connecting an outside power supply to a vehicle so as to supply electric power to the vehicle.

Means for Solving the Problems

A connecting device according to the present invention includes: a shaft; a drum that has a container defined therein and is rotatably disposed on the shaft; a stator that is fixed to the shaft and is contained inside of the container; a rotator that is fixed to the drum, is rotatably disposed on the shaft, and is contained inside of the container with an interval with respect to the stator; first terminals that are disposed in the stator; second terminals that are disposed in the rotator and are brought into contact with the first terminals, respectively; a connecting cord that is wound around the drum, and has a connecting plug to be connected to a vehicle at one end thereof whereas is electrically connected to the second terminals at the other end thereof; a power supply cord having a power source plug to be connected to an outside power supply disposed at one end thereof, and a leakage detector to be connected to the other end of the power supply cord and the first terminals, and is contained inside of the container.

Preferably, the leakage detector should be fixed to the stator or the shaft.

Preferably, the connecting device should further include: a controller that is contained inside of the container, for controlling the drive of the leakage detector; a first signal terminal that is disposed in the stator and is electrically connected to the controller; and a second signal terminal that is disposed in the rotator, is brought into contact with the first signal terminal, and is electrically connected to the connecting plug; wherein the stator and the rotator are arranged in such a manner that their end surfaces arranged in the axial direction of the shaft face each other; the first terminals and the first signal terminal are disposed in the stator at the end surface facing the rotator, serving as an annular metallic ring annularly extending on the shaft; the second terminals and the second signal terminal are disposed in the rotator at the end surface facing the stator; and the first signal terminal is positioned outward of the first terminals whereas the second signal terminal is positioned outward of the second terminals.

Preferably, the connecting device should further include a controller that is contained inside of the container, for controlling the drive of the leakage detector, wherein the controller includes a timer mechanism for supplying electric power to the vehicle connected to the connecting plug during previously inputted time periods.

Preferably, the connecting device should further include: a rotary motor for rotating the drum; and a converter that converts an alternating electric power to be supplied from the power supply cord into a direct electric power, for supplying it as drive electric power for the rotary motor, wherein the rotary motor and the converter are contained inside of the drum. Preferably, the connecting device should further include a controller that is contained inside of the container, for controlling the drive of the leakage detector, wherein the controller and the leakage detector are fixed to the rotator.

Effects of the Invention

With the connecting device according to the present invention, the outside power supply and the vehicle are connected to each other, so that the power storage mounted on the vehicle can be electrically charged, and further, the device per se can be made compact.

DESCRIPTION OF THE REFERENCE SIGNS

100: hybrid vehicle; 190: power supply plug; 191: charger; 200: connecting device; 202: shaft; 203: reel drum; 210: stator; 211, 213, 214: contact piece; 220: rotator; 221, 224, 226: contact pin; 230: charging cord; 240: leakage preventing device; 241: motor; 244: cylindrical portion; 250: containing chamber; 251: leakage detector; 252, 253: relay; 254: Hall sensor; 271: timer; 300: power source plug; 310: power supply cord; B: battery

BEST MODES FOR CARRYING OUT THE INVENTION

With reference to FIGS. 1 to 4, a description will be given of a connecting device for electrically charging a vehicle in an embodiment according to the present invention.

When the number, amount, or the like is referred to in the embodiment described below, the scope of the present invention is not always limited to that number, amount or the like, unless stated otherwise. In addition, in the embodiment described below, each of components is not always indispensable for the present invention, unless stated otherwise.

Figure 1:
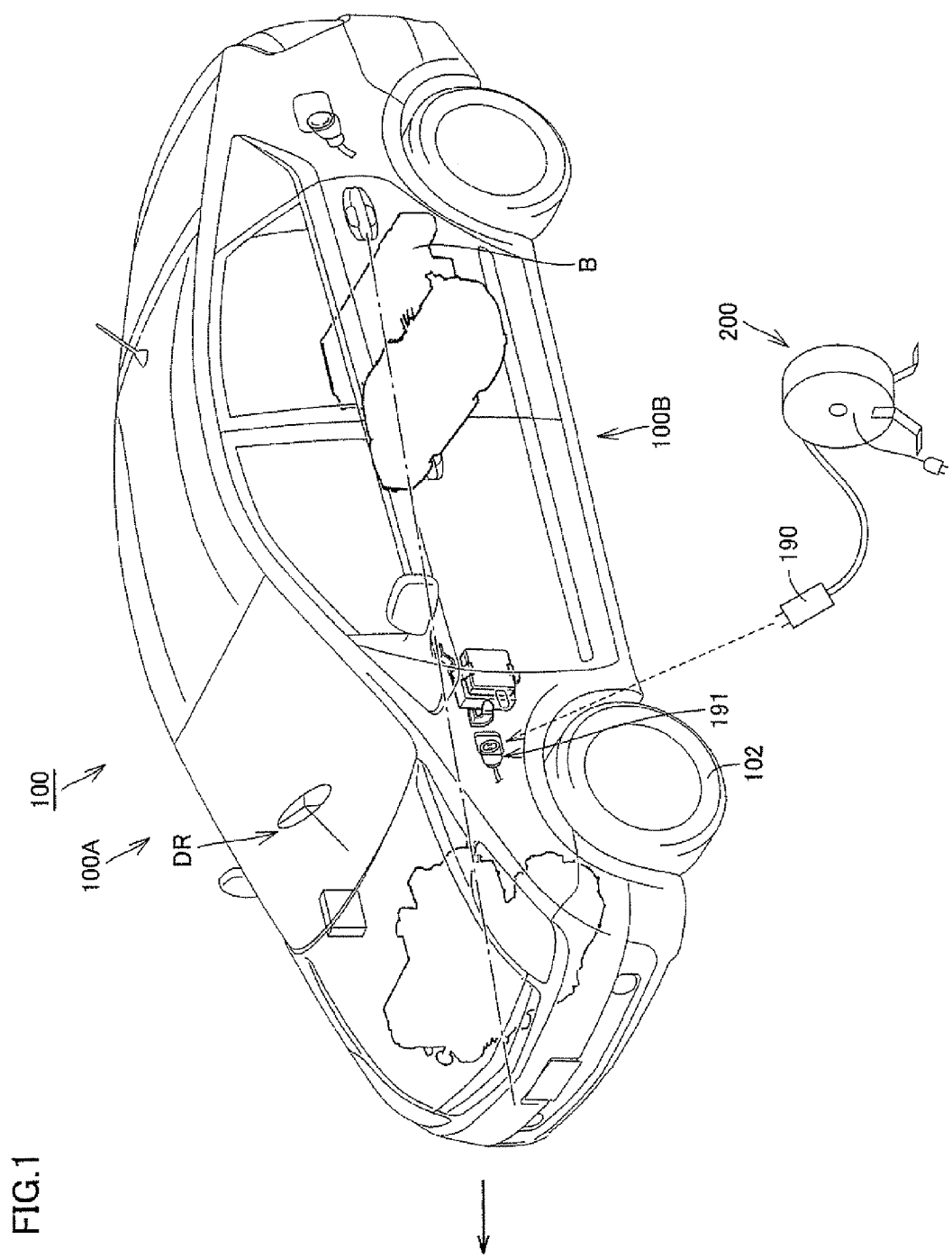
FIG. 1 is a perspective view showing a hybrid vehicle to be electrically charged by using a connecting device in an embodiment according to the present invention.
Figure 2:
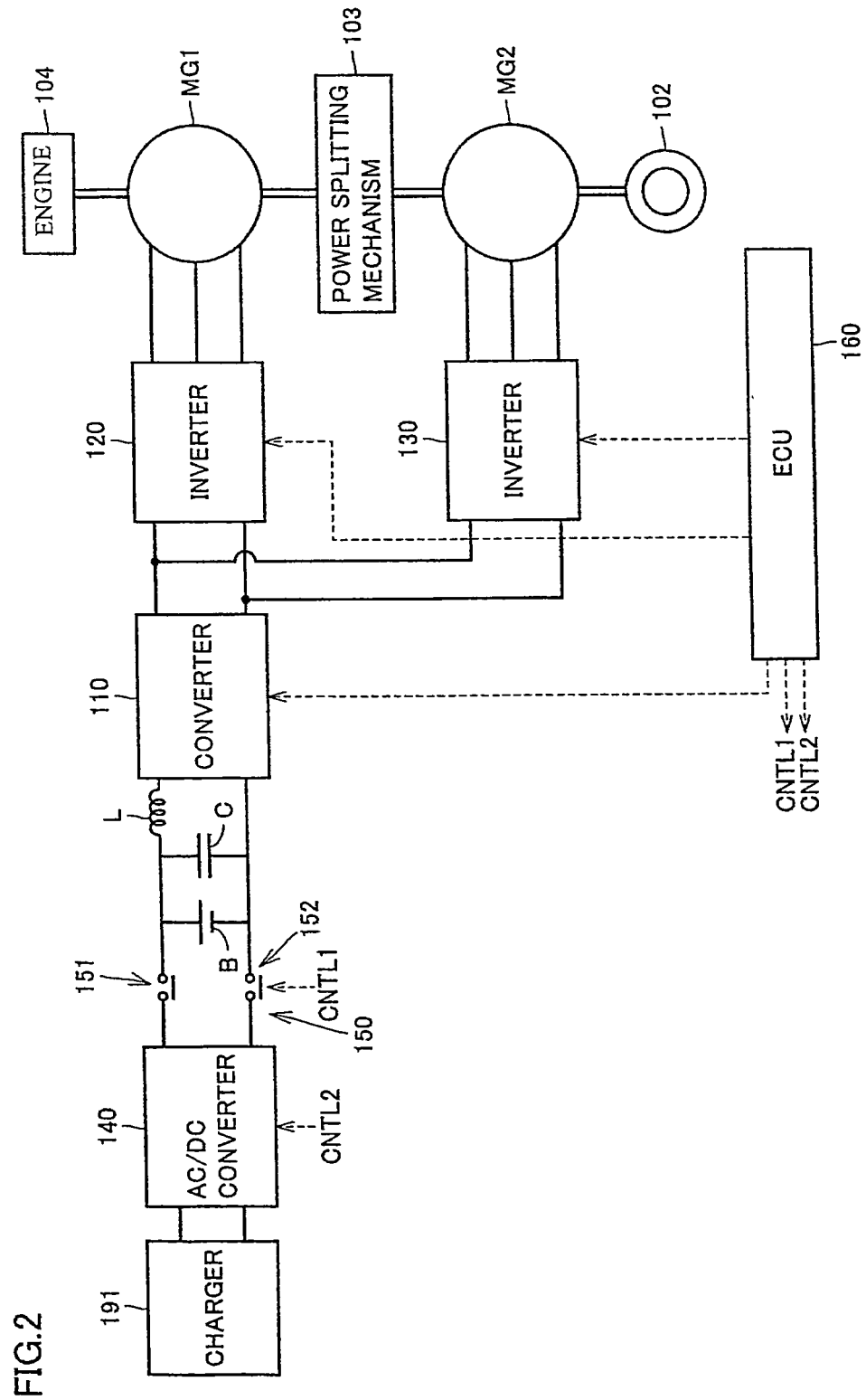
FIG. 2 is a block diagram illustrating a schematic configuration of the hybrid vehicle shown in FIG. 1.

FIG. 1 is a perspective view showing a hybrid vehicle 100 to be electrically charged by using a connecting device 200 in the embodiment according to the present invention. FIG. 2 is a block diagram illustrating a schematic configuration of hybrid vehicle 100 shown in FIG. 1.

Hybrid vehicle 100 uses together a motor and an engine for driving wheels.

Hybrid vehicle 100 is provided with an engine 104, motor generators MG1 and MG2, a power splitting mechanism 103, a battery B, a capacitor C, a reactor L, a converter 110, inverters 120 and 130, and a vehicular ECU 160.

Power splitting mechanism 103 is connected to engine 104 and motor generators MG1 and MG2, to distribute power therebetween. The power splitting mechanism can be exemplified by a planetary gear mechanism having three rotary shafts of a sun gear, a planetary carrier, and a ring gear. The three rotary shafts are connected to rotary shafts of engine 104 and motor generators MG1 and MG2, respectively. For example, a rotor of motor generator MG1 is made hollow, and then, a crankshaft of engine 104 passes through the center of the hollow portion of motor generator MG1, so that engine 104 and motor generators MG1 and MG2 can be mechanically connected to power splitting mechanism 103.

Incidentally, the rotary shaft of motor generator MG2 is coupled to a wheel 102 via a deceleration gear or a differential gear, not shown. A deceleration machine with respect to the rotary shaft of motor generator MG2 may be further incorporated inside of power splitting mechanism 103.

Motor generator MG1 is actuated as a power generator to be driven by the engine, and further, as an electric motor capable of starting the engine. Hence, motor generator MG1 is incorporated in a hybrid automobile. In contrast, motor generator MG2 is incorporated in the hybrid automobile as an electric motor for driving a drive wheel of the hybrid automobile.

Motor generators MG1 and MG2 are, for example, three-phase alternating-current synchronous motors. Each of motor generators MG1 and MG2 includes a three-phase coil formed of a U-phase coil, a V-phase coil, and a W-phase coil as a stator coil.

Motor generator MG1 generates a three-phase alternating-current voltage using an engine output, and then, outputs the generated three-phase alternating-current voltage to inverter 120. In turn, motor generator MG1 generates a driving force by another three-phase alternating-current voltage received from inverter 120, and thus, starts the engine.

In contrast, motor generator MG2 generates a drive torque for a vehicle by a further three-phase alternating-current voltage received from inverter 130. Moreover, motor generator MG2 generates a still further three-phase alternating-current voltage when the vehicle is regeneratively braked, and then, outputs it to inverter 130.

As battery B may be used, for example, a secondary battery such as a nickel-metal-hydride battery, a lithium-ion battery, and a lead-acid battery. Otherwise, battery B may be replaced with a high-capacity electric double layer capacitor.

Hybrid vehicle 100 is provided with a charger 191 on an outer wall of the vehicle such that battery B can be electrically charged by a domestic power supply or the like.

In addition, an AC/DC converter 140 and a switch mechanism 150 are interposed between charger 191 and battery B. AC/DC converter 140 converts an alternating current supplied from charger 191 into a direct current, and further, has a predetermined voltage. Switch mechanism 150 is interposed between AC/DC converter 140 and battery B, and further, is switched between ON and OFF in response to a signal outputted from vehicular ECU 160.

In the example shown in FIG. 1, charger 191 is mounted in a front fender, but is not limited to this position. Charger 191 is provided with a plug portion, into which a power supply plug 190 is inserted, and a cover that is openably disposed on the outer wall of the front fender or the like. When power supply plug 190 of connecting device 200 is inserted into the plug portion, battery B can be electrically charged.

Figure 3:
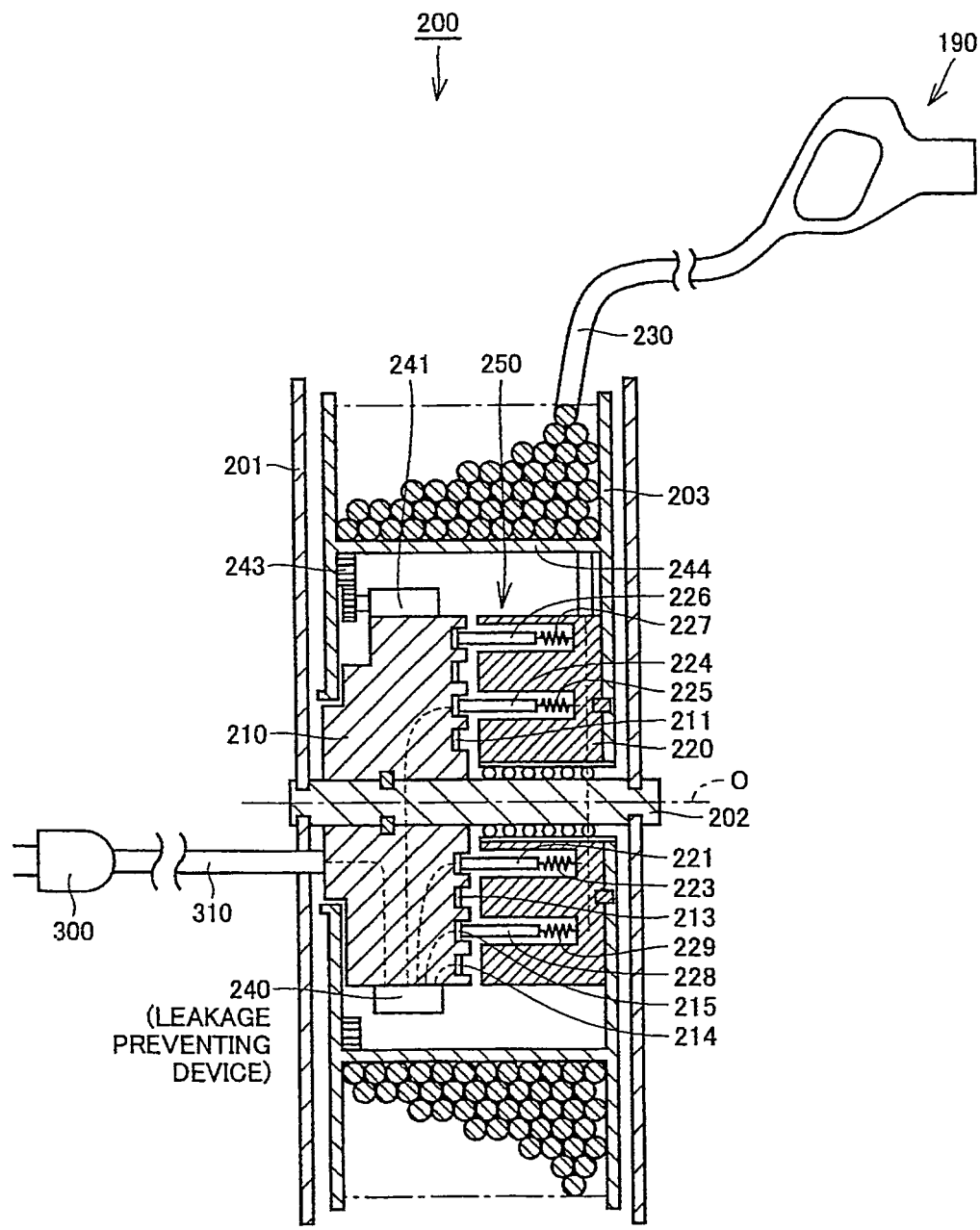
FIG. 3 is a side cross-sectional view showing the connecting device according to the present invention.

FIG. 3 is a side cross-sectional view showing connecting device 200 according to the present invention. As shown in FIG. 3, connecting device 200 includes a power source plug 300 to be connected to an external domestic power supply or the like, a power supply cord 310 connected to power source plug 300, power supply plug 190 to be connected to charger 191 for hybrid vehicle 100, and an elongated charging cord 230 connected to power supply plug 190.

In a state in which power source plug 300 is connected to a power supply such as the domestic power supply, power supply plug 190 is connected to charger 191, so that electric power supplied from the power supply is designed to be supplied to hybrid vehicle 100 via power supply plug 190.

Connecting device 200 is provided with a shaft 202 and a reel drum 203 that is rotatably disposed in shaft 202 and has charging cord 230 wound around the periphery thereof.

Reel drum 203 is provided with disc-like side walls disposed in a direction of a center axis O of shaft 202 with an interval and a cylindrical portion 244 that connects the side walls to each other and has center axis O as the center thereof. Charging cord 230 is wound around the periphery of cylindrical portion 244. Each of the side walls reaches outward in a radial direction beyond cylindrical portion 244, and thus, can support sideways charging cord 230 wound around cylindrical portion 244.

The inside of cylindrical portion 244 serves as a containing chamber 250 that can contain various kinds of equipment therein. In the example shown in FIG. 3, a leakage preventing device 240 for preventing any leakage and a motor 241 are contained inside of containing chamber 250.

Motor 241 rotates a gear meshing with a gear 243 formed at the inner circumferential surface of reel drum 203, thereby rotating reel drum 203. Consequently, charging cord 230 wound around reel drum 203 can be drawn out to the outside or drawn charging cord 230 can be wound up.

In this manner, various kinds of equipment are contained inside of containing chamber 250, so that a dead space can be effectively utilized, and as a result, connecting device 200 can be made compact.

At both ends of shaft 202 are fixed side walls 201 that have legs or the like, not shown, so that connecting device 200 can be placed on the ground.

Connecting device 200 is provided with connecting equipment for electrically connecting power source plug 300 and power supply cord 310 to supply plug 190 and charging cord 230. The connecting equipment also is contained inside of containing chamber 250.

Specifically, connecting device 200 includes a stator 210 securely fixed around shaft 202 and a rotator 220 that is separated from stator 210 with an interval in the direction of center axis O and is rotatably disposed on shaft 202. Stator 210 and rotator 220 each are contained inside of containing chamber 250, wherein rotator 220 is secured onto the inner wall of reel drum 203.

Out of both end surfaces of stator 210 arranged in the direction of center axis O, one end surface facing the end surface of rotator 220 has contact pieces (terminals) 211, 213, 214, and 215. Each of contact pieces 211, 213, 214, and 215 is formed into an annular shape on center axis O, and is made of a conductive metallic material. Here, contact piece (first signal terminal) 214 is positioned outward in the radial direction more than other contact pieces (first terminals) 211, 213, and 215.

To contact pieces 211 and 213 are connected electric lines drawn from leakage preventing device 240, and further, to leakage preventing device 240 is connected power supply cord 310, so that a current flows in contact pieces 211 and 213 from an outside power supply. In the meantime, to contact piece 214 is connected a signal line drawn from leakage preventing device 240. Moreover, to contact piece 215 is connected a ground line. Here, the ground line is connected to power source plug 300 via leakage preventing device 240 and power supply cord 310.

Out of end surfaces of rotator 220 arranged in the direction of center axis O, one end surface facing stator 210 has contact pins 221, 224, 228, and 226 with intervals in the radial direction. Contact pins 221, 224, 228, and 226 each are inserted into holes formed at the end surface, and are urged toward contact pieces 211, 213, 215, and 214 via spring members 223, 225, 229, and 227, respectively. The tips of contact pins 221, 224, 228, and 226 are brought into contact with contact pieces 211, 213, 215, and 214, respectively. As a result, contact pins 221, 224, 228, and 226 and contact pieces 211, 213, 215, and 214 are electrically connected to each other, respectively. Each of contact pins 221, 224, 228, and 226 also is made of a conductive metallic material.

In rotator 220 are embedded wirings connected to contact pins 221, 224, 228, and 226. The wirings are connected to one end of charging cord 230, and further, are connected, via charging cord 230, to supply plug 190 disposed at the other end of charging cord 230. When supply plug 190 is connected to charger 191, contact pins 221 and 224 are electrically connected to battery B while contact pin 226 is electrically connected to vehicular ECU 160.

Contact pieces 211 and 213 electrically connected to contact pins 221 and 224, respectively, are connected to one end of power supply cord 310 via leakage preventing device 240, and further, are connected to power source plug 300 disposed, via power supply cord 310, at the other end of power supply cord 310. Contact piece 214 to be electrically connected to contact pin 226 is connected to leakage preventing device 240.

Electric power from the outside power supply is supplied to leakage preventing device 240 through power source plug 300, and thereafter, is supplied to charging cord 230 and supply plug 190 via contact pieces 211 and 213 and contact pins 221 and 224. A signal outputted from leakage preventing device 240 is transmitted to supply plug 190 via contact piece 214, contact pin 226, and charging cord 230.

Here, when charging cord 230 is drawn out or wound up, rotator 220 and reel drum 203 are rotated, wherein rotator 220 is rotated relatively to stator 210. Consequently, contact pins 221, 224, 228, and 226 are moved in an extension direction of contact pieces 211, 213, 215, and 214 while being brought into contact with contact pieces 211, 213, 215, and 214.

Contact pieces 215 and 214 are arranged more outward than contact pieces 211 and 213 in stator 210, to which the electric lines are connected, and further, contact pins 228 and 226 are arranged more outside than contact pins 221 and 224 in rotator 220. Therefore, while reel drum 203 is rotated once, a distance of advance of contact pieces 211 and 213 and contact pins 221 and 224 in contact with each other is shorter than a distance of advance of contact piece 214 and contact pin 226 in contact with each other. As a result, while reel drum 203 is rotated once, frictional force generated between contact pieces 211 and 213 and contact pins 221 and 224 can be suppressed to a level lower than frictional force generated between contact piece 214 and contact pin 226. Secular degradation of contact pieces 211 and 213 and contact pins 221 and 224 can be suppressed, so that electric conduction of the power line can be secured for a long period of time, and further, an increase in electric resistance caused by abrasion between contact pieces 211 and 213 and contact pins 221 and 224 can be suppressed. In the meantime, a current flowing in the signal line is reduced in comparison with a current flowing in the power line. Therefore, when contact piece 214 and contact pin 226 are brought into contact with each other, a signal outputted from leakage preventing device 240 can be transmitted to hybrid vehicle 100.

In the example illustrated in FIG. 3, contact pieces 213 and 212 are positioned more inward in the radial direction than contact piece 214, and further, contact pins 221 and 224 are positioned more inward in the radial direction than contact pin 226.

In this manner, stator 210, rotator 220, contact pieces 211, 213, 215, and 214, the contact pins, and the like configure the connecting equipment for electrically connecting power source plug 300 and supply plug 190 to each other. Such connecting equipment is contained inside of containing chamber 250, thus making connecting device 200 per se compact.

Leakage preventing device 240 and motor 241 are fixed to stator 210. Therefore, when, for example, charging cord 230 is drawn out or wound up and contained, leakage preventing device 240 and motor 241 can be prevented from being rotated together with the rotation of reel drum 203, thus suppressing a damage on leakage preventing device 240 and motor 241. Leakage preventing device 240 and motor 241 may be fixed to shaft 202.

Figure 4:
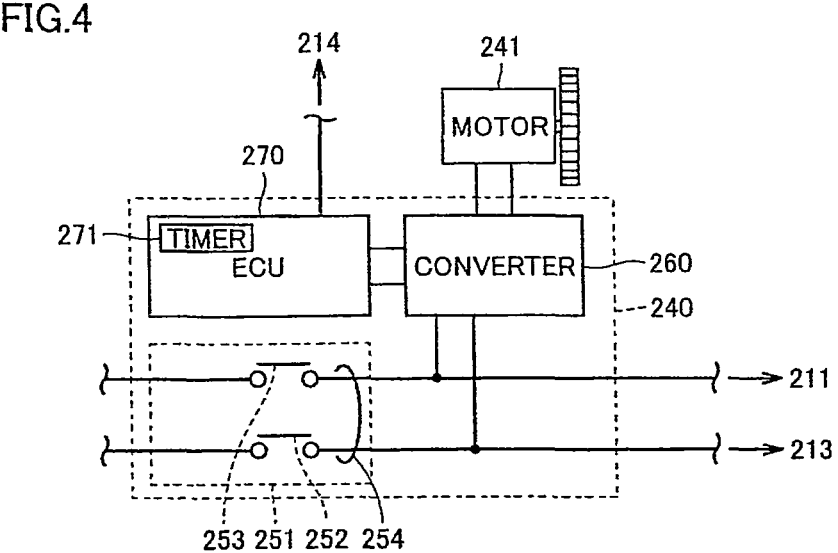
FIG. 4 is a block diagram schematically illustrating the inside configuration of a leakage preventing device.

FIG. 4 is a block diagram schematically illustrating the inside configuration of leakage preventing device 240. As illustrated in FIG. 4, leakage preventing device 240 is provided with an ECU 270, a leakage detector 251 including relays 252 and 253 and a Hall sensor 254, and a converter 260 for converting an alternating current to be supplied from power supply cord 310 to thus supply it to ECU 270 and motor 241. Both of leakage detector 251 and converter 260 are fixed to stator 210 or shaft 202.

Hall sensor 254 transmits a voltage signal to ECU 270 during leakage. ECU 270 separates relays 252 and 253 from each other upon receipt of the voltage signal from Hall sensor 254. Converter 260 is an AC/DC converter that reduces a voltage down to a predetermined value and converts alternating power into direct power, so as to supply it to ECU 270 and motor 241 as drive power.

ECU 270 transmits a voltage and a current of the electric power supplied from the outside power supply to vehicular ECU 160 mounted on hybrid vehicle 100. And then, vehicular ECU 160 controls AC/DC converter 140 mounted on hybrid vehicle 100 to drive it based on transmitted information, to convert the current into a direct current having a predetermined voltage. Thereafter, the converted current is supplied to battery B.

Moreover, ECU 270 is provided with a timer 271. Timer 271 turns off relays 252 and 253 during a period till a predetermined time set previously by a user, and further, does not transmit a signal to vehicular ECU 160 of hybrid vehicle 100. Timer 271 transmits the signal to vehicular ECU 160 at the predetermined time, and further, turns on relays 252 and 253. As a result, power source plug 300 is connected to the outside power supply. Even if power supply plug 190 is connected to charger 191, vehicular ECU 160 does not receive any signal from ECU 270 during the period till the predetermined time. As a result, vehicular ECU 160 does not start control for electric charging till the predetermined time when it receives the signal from ECU 270 whereas starts the electric charging and driving at the predetermined time.

Vehicular ECU 160 receives the signal outputted from ECU 270, and then, transmits a switch signal CNTL1 to switch mechanism 150 and turns on switch mechanism 150, and further, transmits a drive signal CNTL2 to AC/DC converter 140, thus driving AC/DC converter 140. In this manner, battery B can be electrically charged at night for a lower electricity rate.

Figure 5:
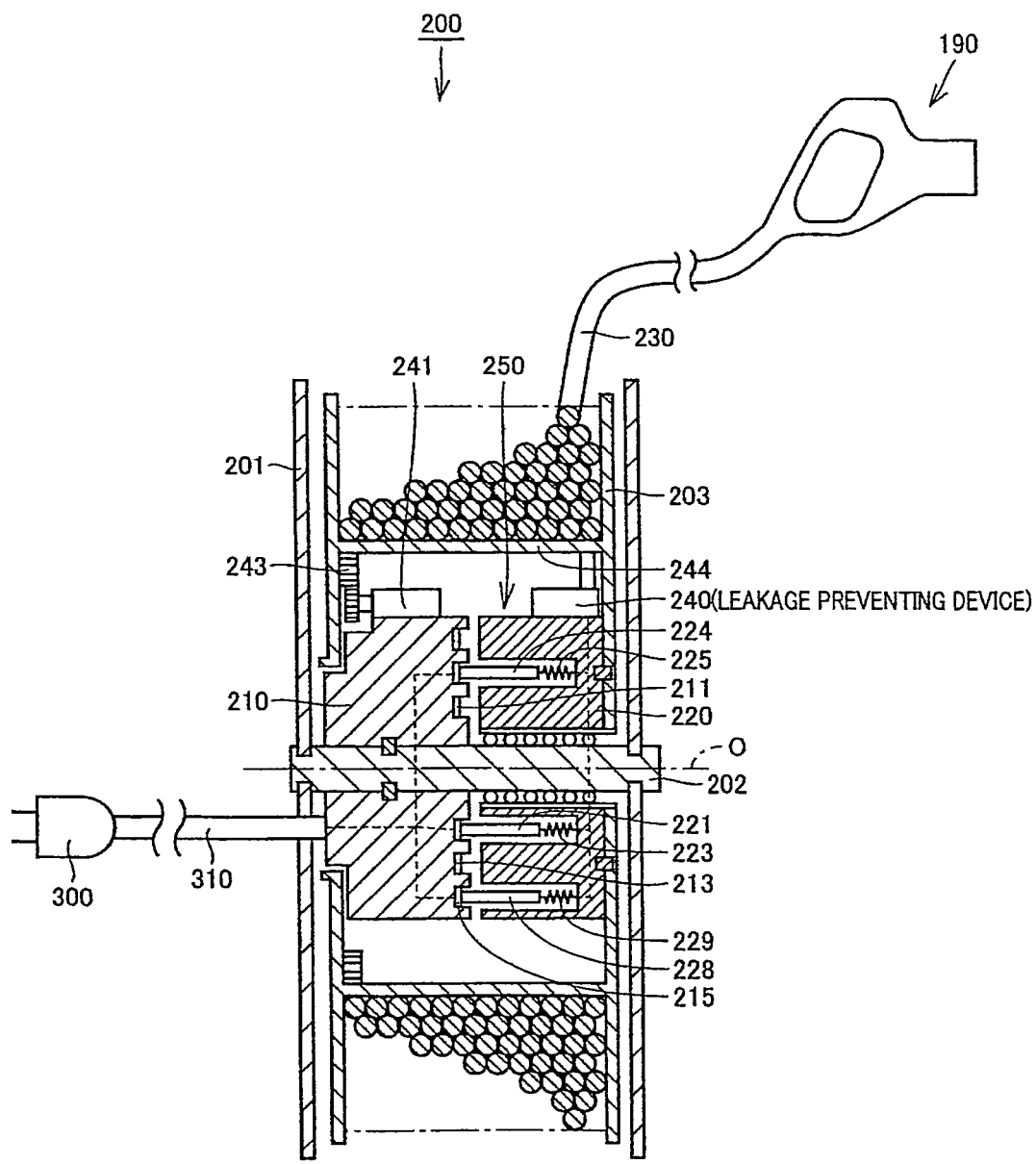
FIG. 5 is a cross-sectional view showing a modification of the connecting device shown in FIG. 3.

FIG. 5 is a cross-sectional view showing a modification of connecting device 200 shown in FIG. 3. In an example shown in FIG. 5, a leakage preventing device 240 is attached to the outer peripheral surface of a rotator 220. In this manner, since leakage preventing device 240 is disposed on the side of rotator 220, a signal line of leakage preventing device 240, drawn from an ECU 270 can be directly connected to a charging cord 230, thereby making it unnecessary to dispose a terminal for the signal line between a stator 210 and rotator 220, so as to reduce the number of component parts.

Also in the example shown in FIG. 5, contact pieces 211 and 213 connected to electric lines are arranged more inward in a radial direction than a contact piece 215 connected to a ground line. Contact pins 221, 224, and 228 are electrically connected to leakage preventing device 240.

Although the embodiment according to the present invention has been described above, it is understood that the embodiment should be merely illustrative in all points but not restrictive. The scope of the present invention is expressed by claims inclusive of significances equivalent to claims and all variations within the scope. Furthermore, the above-described numeric values or the like are illustrative, and therefore, are not limited to the above-described numeric values and scope.

INDUSTRIAL APPLICABILITY

The present invention is suitable for the connecting device that has the connecting plug to be connected to the vehicle and the power source plug to be connected to the power supply, for supplying the electric power from the outside power supply to the vehicle.

The invention claimed is:

1. A connecting device comprising:
a shaft;
a drum that has a container defined therein, the drum being rotatably disposed on said shaft;
a stator that is fixed to said shaft and is contained inside of said container;
a rotator that is: i) fixed to said drum, ii) rotatably disposed on said shaft, and iii) contained inside of said container separated by an interval from said stator;
first terminals that are disposed in said stator;
second terminals that are disposed in said rotator and are brought into contact with said first terminals, respectively;
a connecting cord that is wound around said drum, the connecting cord having one end that includes a connecting plug configured to be connected to a vehicle, the cord having another end configured to be electrically connected to said second terminals;
a power supply cord having a power source plug configured to be connected to an outside power supply disposed at one end thereof;
a leakage detector that is: i) configured to be connected to the other end of said power supply cord and said first terminals, and ii) contained inside of said container;
a controller, that is i) contained inside of said container, and ii) configured to control a drive of said leakage detector;
a first signal terminal that is disposed in said stator and is electrically connected to said controller; and
a second signal terminal that is: i) disposed in said rotator, ii) brought into contact with said first signal terminal, and iii) electrically connected to said connecting plug; wherein
said stator and said rotator are arranged in such a manner that their end surfaces arranged in an axial direction of said shaft face each other,
said first terminals and said first signal terminal are disposed in said stator at the end surface facing said rotator, serving as an annular metallic ring annularly extending on said shaft,
said second terminals and said second signal terminal are disposed in said rotator at the end surface facing said stator, and
said first signal terminal is positioned outward of said first terminals whereas said second signal terminal is positioned outward of said second terminals.

2. The connecting device according to claim 1, wherein said leakage detector is fixed to said stator or said shaft.

3. The connecting device according to claim 1, wherein said controller includes a timer mechanism configured to supply electric power to said vehicle connected to said connecting plug during given time periods.

4. The connecting device according to claim 1, further comprising:

a rotary motor configured to rotate said drum; and
a converter that is configured to: i) convert an alternating electric power to be supplied from said power supply cord into a direct electric power, and ii) supply the direct electric power as drive electric power for said rotary motor, wherein
said rotary motor and said converter are contained inside of said drum.

* * * * *